(12) United States Patent
Lee et al.

(10) Patent No.: US 9,163,675 B2
(45) Date of Patent: Oct. 20, 2015

(54) CLUTCH CONTROL DEVICE

(75) Inventors: Dong Guen Lee, Jeollabuk-do (KR);
Seong Cheol Lee, Jeollabuk-do (KR);
Seong Jin Kim, Jeollabuk-do (KR);
Byeong Cheol Baek, Jeollabuk-do (KR)

(73) Assignee: WONKWANG E & TECH CO., LTD.,
Jeollabuk-do (KR)

( * ) Notice: Subject to any disclaimer, the term of this patent is extended or adjusted under 35 U.S.C. 154(b) by 0 days.

(21) Appl. No.: 14/360,411

(22) PCT Filed: Dec. 7, 2011

(86) PCT No.: PCT/KR2011/009414
§ 371 (c)(1),
(2), (4) Date: May 23, 2014

(87) PCT Pub. No.: WO2013/077486
PCT Pub. Date: May 30, 2013

(65) Prior Publication Data
US 2014/0332337 A1    Nov. 13, 2014

(30) Foreign Application Priority Data

Nov. 24, 2011 (KR) .................. 10-2011-0123502

(51) Int. Cl.
*F16D 25/08* (2006.01)
*F16D 25/06* (2006.01)
*B60K 23/02* (2006.01)
*F16D 48/04* (2006.01)

(52) U.S. Cl.
CPC ............... *F16D 25/06* (2013.01); *B60K 23/02* (2013.01); *F16D 25/088* (2013.01); *F16D 48/04* (2013.01); *B60Y 2400/301* (2013.01); *F16D 2300/18* (2013.01)

(58) Field of Classification Search
None
See application file for complete search history.

(56) References Cited

U.S. PATENT DOCUMENTS

2009/0247357 A1 * 10/2009 Doebele et al. .................. 477/78
2012/0010795 A1 * 1/2012 Hilberer .......................... 701/68

FOREIGN PATENT DOCUMENTS

| DE | 44 39 447 C1 * | 3/1996 |
| JP | 07-293589 | 11/1995 |
| JP | 10-252779 | 9/1998 |
| KR | 10-1997-0045923 | 7/1997 |
| KR | 10-2010-0080434 | 7/2010 |
| WO | WO 2008/019938 A1 * | 2/2008 |

OTHER PUBLICATIONS

International Search Report mailed Nov. 23, 2012 for PCT/KR2011/009414.

* cited by examiner

*Primary Examiner* — Rodney H Bonck

(57) ABSTRACT

The present invention relates to a clutch control device, more particularly, to a clutch control device wherein a mechanical section may be miniaturized and operational errors can be reduced using a non-contact type displacement detection system which uses a linear distance sensor for a clutch clearance and the position of the mechanical section can be accurately controlled by using a plurality of solenoid valves.

15 Claims, 5 Drawing Sheets

< Prior Art >

CLUTCH CONTROL DEVICE

This application claims the priority of Korean Patent Application No. 10-2011-0123502, filed on Nov. 24, 2011 in the KIPO (Korean Intellectual Property Office), the disclosure of which is incorporated herein entirely by reference. Further, this application is the National Stage application of International Application No. PCT/KR2011/009414, filed Dec. 7, 2011, which designates the United States and was published in Korean. Each of these applications is hereby incorporated by reference in their entirety into the present application.

TECHNICAL FIELD

The present disclosure relates to a clutch control device, and more particularly, to a clutch control device for reducing an operation error in a clutch clearance by means of a non-contact type displace detector using a straight distance sensor with a small design and also allowing accurate position control by using a plurality of solenoid valves.

BACKGROUND ART

A clutch means a device for connecting or disconnecting a pair of concentric rotary shafts in an easy and rapid way. The clutch is generally provided between shafts connected to an engine and a machine to operate or stop the machine, and also allows an engine to operate in a non-load state like a vehicle.

A clutch used in a commercial vehicle has a power transmission function for transmitting a rotating force of an engine to a transmission and a power blocking function for temporarily blocking a power flow between an engine and a transmission whenever required. The clutch also allows a machine to start operation softly without a vibration, protects the engine and the power transmission device against overloads, and reduces a rotation vibration of the engine together with a flywheel.

FIG. 1 shows a structure of a general clutch. As shown in FIG. 1 a clutch generally includes a clutch pedal 1 for receiving a manipulating force of a driver, a master cylinder 3 for transmitting the power of the clutch pedal 1, an air pump 5 connected to the master cylinder 3 to supply an air pressure, a booster cylinder 7 having a piston rod 7a operating with the air pressure supplied from the air pump 5, a release cylinder 9 for operating a clutch 11 with the air pressure provided from the booster cylinder 7, and a shift lever 13 hinged to connect the release cylinder 9 and the clutch 11. The push rod 9a of the release cylinder 9 has a restoring force by means of a spring 9b.

In the clutch configured as above, if a driver steps down the clutch pedal 1, the force operates the piston rod 3a of the master cylinder 3 so that the air pressure supplied from the air pump 5 flows via an air pressure guiding unit 51 to the booster cylinder 7. The introduced air pressure moves the piston rod 7a of the booster cylinder 7, which allows the push rod 9a of the release cylinder 9 to move. If the push rod 9a moves, the shift lever 13 allows a clutch disc of the clutch 11 to be separated from a driving plate of an engine, thereby blocking the power transmitted to wheels.

However, when a vehicle is in a congested or slow-down section or drives in a city, the clutch pedal should be numerously operated, which increases the fatigue of a driver and strains the knee and the waste.

If an automatic transmission is mounted to solve the above convenience, even though a driver may feel convenience and comfort, an initial purchasing price increases, and fuel consumption increases by about 20 to 30% in comparison to a manual transmission.

To solve this problem, many semi-auto clutches have been proposed. However, a semi-auto clutch is complicated, which gives problems in repair and maintenance, and it is very difficult to attach the semi-auto clutch to an existing vehicle. Therefore, there is demanded a clutch control device which may be simply attached to or detached from an existing vehicle and ensure convenient maintenance.

In particular, if a semi-auto clutch is used, its rotation is read using a potentiometer by controlling a clutch operation with a motor, and the rotation is converted into a straight displacement to calculate a clutch clearance and control transmission. Due to this reason, the machine size increases and the semi-auto may not be easily mounted to a vehicle.

In addition, when converting the rotation into a displacement, an error is caused due to a mechanical SLIP or the like, which may result in unnecessary transmission impacts

DISCLOSURE OF THE INVENTION

Technical Problem

The present disclosure is directed to providing a clutch control device, which may release a clutch by means of an electromagnetic switch to increase convenience in gear transmission, ensure simple attachment to or detachment from an existing vehicle to improve the convenience in maintenance, and allows a beginner driver to easily manipulate.

In particular, the present disclosure is directed to providing a clutch control device, which ensures easy driving under various driving conditions by automatically implementing a half-clutch state, and arbitrarily operates to a strong half-clutch state in a severe condition so that a beginner driver may easily drive a vehicle.

In addition, a non-contact type displace detector using a straight distance sensor such as a PSD sensor is used to check a clutch clearance, different from an existing technique, so that the machine size decreases and an operation error is reduced.

Technical Solution

In one general aspect, the present disclosure gives the following technical solutions.

The present disclosure provides a clutch control device, which is connected to a booster cylinder 7 for operating a clutch 11 to control the clutch.

The clutch control device including: a first housing 35; a body 44 configured to be movable in a linear direction in the first housing 35 and have a hydraulic pressure regulating rod 46 provided at a front side thereof; a cylinder 82 connected to a hydraulic line 83 connected to the booster cylinder 7, the hydraulic pressure regulating rod 46 being partially inserted into the cylinder 82 to supply a hydraulic pressure to the hydraulic line according to a movement of the body 44; a sensor unit 71 configured to measure a straight distance of the body 44 which is moving in the first housing 35; a second housing 31 provided at a rear side of the first housing 35; a piston head 41 configured to divide the second housing 31 into a sealed first chamber 32 and a sealed second chamber 33, the piston head 41 being movable in a straight direction in the second housing 31 due to a pressure difference between the first chamber 32 and the second chamber 33; a piston rod 43 configured to connect the piston head 41 and the body 44; a pressure regulating unit 20 provided in the first chamber 32 to regulate a pressure; and a control unit 39 for controlling a pressure of the pressure regulating unit 20 according to a distance measured by the sensor unit 71.

The pressure regulating unit 20 may connected to a pressure pump located at the outside through an air flow tube 201, and the pressure regulating unit 20 may include a plurality of orifices through which an air flows between the air flow tube 201 and the first chamber 32, and a plurality of solenoid valves controlled according to a signal of the control unit 39 to regulate the plurality of orifices to be opened or closed.

In this case, the plurality of orifices may be a first orifice 21, a second orifice 22 and a third orifice 23, which have different diameters, and the plurality of solenoid valves may be a first solenoid valve 61, a second solenoid valve 62, and a third solenoid valve 63.

At this time, the clutch control device may further include a reflection plate 72 which moves together with the body 44, and the sensor unit 71 may be fixed to the first housing 35 to measure a straight distance from the reflection plate 72.

In addition, an elastic member 75 having a restoring force to push the piston head 41 toward the first chamber 32 may be further provided in the second chamber 33.

In particular, the clutch control device may further include a valve 85 configured to connect the cylinder 82 to a master cylinder 3 which supplies a hydraulic pressure by a manipulation of a clutch pedal 1, and a sensor configured to recognize whether the clutch pedal 1 is pressed, and when it is sensed by the sensor that the clutch pedal 1 is pressed, the valve may be opened, the control unit 39 may stop operation of the pressure pump, and the solenoid valves 63 may be opened.

Advantageous Effects

According to the present disclosure, there is provided a clutch control device which may be easily attached to or detached from an existing vehicle, ensure convenient maintenance, and allow a beginner driver to easily manipulate.

In addition, since a non-contact type displace detector using a straight distance sensor such as a PSD sensor is used to check a clutch clearance, different from an existing technique, the machine size decreases and an operation error is reduced.

MODE FOR CARRYING OUT THE INVENTION

Hereinafter, the embodiments of the present disclosure will be described in detail with reference to accompanying drawings.

However, in the description, details of well-known features and techniques may be omitted to avoid unnecessarily obscuring the presented embodiments. Even though the same term is used, different reference symbols may be used if the same term indicates different components.

In addition, the terms used herein are set in consideration of functions in the present disclosure, which may be changed as intended by users such as experimenters or measurers or according to custom, and thus each term should be defined based on the entire specification.

Figure 1:
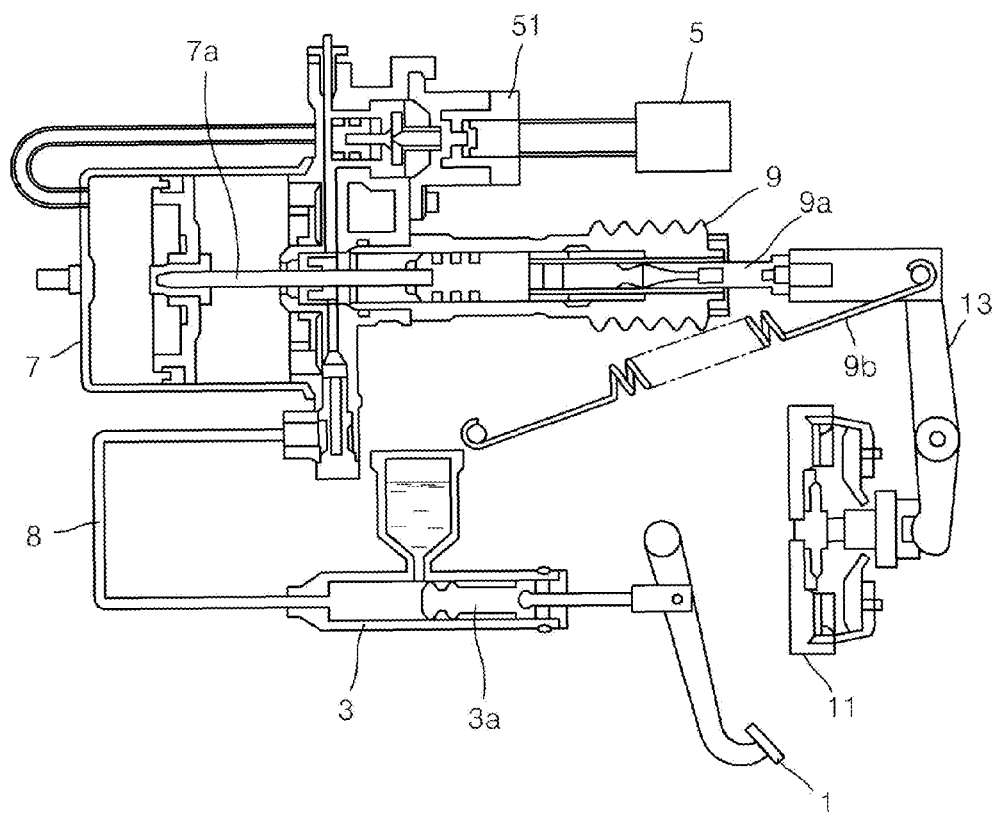
FIG. 1 is a diagram showing a general clutch.
Figure 2:
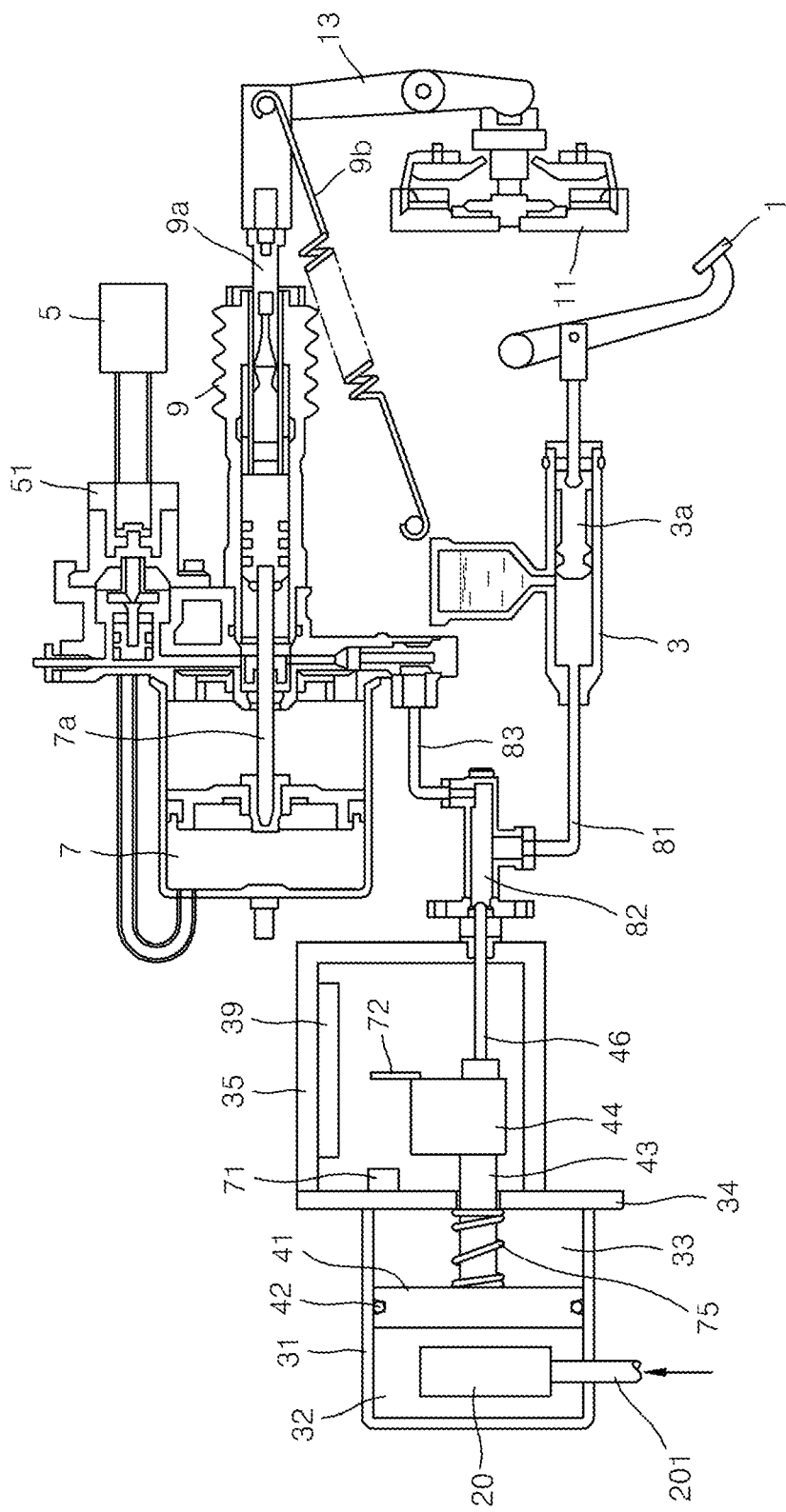
FIG. 2 is a diagram showing a clutch control device according to the present disclosure, which is in a mounted state.

FIG. 2 shows a clutch control device according to the present disclosure, which is coupled to an existing clutch. However, the clutch control device is depicted simply so that essential parts of the present disclosure may be clearly shown.

The present disclosure is directed to a clutch control device connected to a booster cylinder 7 for operating a clutch 11 to control the clutch, and the clutch control device is connected to a clutch pedal 1 through a master cylinder 3.

The clutch control device of the present disclosure is generally divided into a first housing 35 and a second housing 31 located at the rear of the first housing 35. In this specification, the term "rear" means a direction from a cylinder 82 to the first housing 35, based on FIG. 2, and the term "front" means a direction from the first housing 35 to the cylinder 82.

In addition, the present disclosure is characterized in a pressure regulating unit 20, described later, in the first chamber 32. A pressure pump for supplying a compressed air to the pressure regulating unit 20 is not depicted but should be understood that the pressure pump is connected through an air flow tube 201.

The clutch control device of the present disclosure includes a first housing 35, a body 44 movable in a straight direction in the first housing 35 and having a hydraulic pressure regulating rod 46 at a front side thereof, and a cylinder 82 connected to a hydraulic line 83 connected to the booster cylinder 7, wherein that the hydraulic pressure regulating rod 46 is partially inserted into the cylinder 82 so that a hydraulic pressure is supplied to the hydraulic line according to a movement of the body 44.

The present disclosure is characterized in that the body 44 makes a straight movement, and the clutch is controlled by directly measuring a straight moving distance of the body 44. In an existing technique, a stepping motor is used to control a position by means of a rotation sensor. However, in this technique, a linear value is obtained by measuring a rotation value and then converting the rotation value into a linear value, which has a very unstable response performance. In particular, if the stepping motor is worn, an error may occur in position control.

However, in order to solve this problem, in the present disclosure, a stepping motor is not used, but a straight distance measuring sensor such as a PSD (Position Sensitive Device) sensor is used for position control, which gives an accurate linear value and fundamentally removes the possibility of abrasion by using a non-contact manner to ensure high durability.

In addition, a stepping motor employed in an existing technique is very weak against moisture, and thus various problems have occurred in relation to moisture-proofing since the clutch control device should be mounted to a lower portion of a vehicle. Therefore, in the present disclosure, a solenoid valve having very good moisture-proofing property is used for the position control.

For this, the clutch control device of the present disclosure includes a sensor unit 71 for measuring a straight distance of the body 44 which is moving in the first housing 35. As described above, the sensor unit 71 is used for measuring a relative straight moving distance of the body 44. Therefore, any sensor capable of measuring a straight distance such as a PSD sensor, an ultrasonic sensor, an infrared sensor or the like may be used.

In order to enhance the performance in distance measurement, a reflection plate 72 moving together with the body 44 may be further provided. The sensor unit 71 is fixed to the first housing 35, and the reflection plate 72 moves along with the body 44 to measure a moving straight distance.

The measured distance between the sensor unit 71 and the reflection plate 72 is transmitted to a control unit 39 by communication and is used as a basis for controlling the solenoid valve.

Hereinafter, an operating principle of the body 44 will be described in more detail.

The second housing 31 is provided at the rear of the first housing 35, and the second housing 31 is divided into a sealed first chamber 32 and a sealed second chamber 33, respectively. In addition, a piston head 41 movable in a straight direction in the second housing 31 due to a pressure difference between the first chamber 32 and the second chamber 33 is further provided.

The piston head 41 is connected to the body 44 by means of a piston rod 43.

The piston head 41 moves along the second housing 31 according to a pressure in the first chamber 32. The piston head 41 may further include a piston ring 42 to seal the first chamber 32 and the second chamber.

However, the pressure in the first chamber 32 may change, and the pressure in the second chamber 33 may be constantly kept as an atmospheric pressure or in a vacuum. In other words, the pressure may be adjusted only in the first chamber 32 for cost reduction.

For this, an elastic member 75 having a restoring force may be further provided in the second chamber 33 to push the piston head 41 toward the first chamber 32. As shown in the figures, the elastic member has a spring shape surrounding the piston rod 43, in which one end of the elastic member is fixed to the piston head 41 and the other end is fixed to a boundary wall between the first housing 35 and the second housing 31.

If the pressure in the first chamber 32 is very low, the piston head 41 tends to move toward the first chamber 32 due to the restoring force of the elastic member 75, and if the pushing force by the pressure in the first chamber 32 is greater than the restoring force of the elastic member 75, the piston head 41 moves toward the second chamber 33.

In other words, it should be understood that the present disclosure is characterized in that the movement of the piston head 41 is controlled by adjusting the pressure in the first chamber 32, and therefore the movement of the body 44 connected thereto is controlled.

For this, the clutch control device of the present disclosure includes a pressure regulating unit 20 provided in the first chamber 32 to adjust the pressure therein, and a control unit 39 for controlling the pressure of the pressure regulating unit 20 according to the distance measured by the sensor unit 71.

The pressure regulating unit 20 is connected to an external pressure pump (not shown) through the air flow tube 201. The pressure pump is also configured to supply a compressed air to the pressure regulating unit 20 or discharge the air in the first chamber 32 to the outside through the pressure regulating unit 20 according to a signal of the control unit 39.

Figure 3:
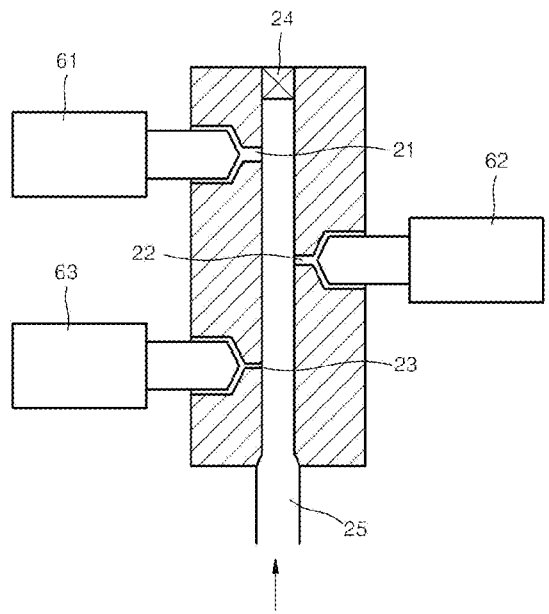
FIGS. 3 to 5 are diagrams showing a pressure regulating unit employed in the clutch control device according to the present disclosure.

As shown in FIG. 3, the pressure regulating unit 20 has a body with an inner tube 25 connected to the air flow tube 201. A plurality of orifices is formed in the inner tube 25.

The present disclosure is characterized in that a solenoid valve is mounted to each of the plurality of orifices, and each orifice is opened or closed using the solenoid valve according to a predetermined program. By doing so, the amount of air introduced from the pressure pump to the first chamber 32 is adjusted, or the amount of air discharging from the first chamber 32 when the pressure pump is in an off state is adjusted, thereby controlling the pressure of the first chamber 32.

For this, the pressure regulating unit includes a plurality of orifices through which air flows between the air flow tube 201 and the first chamber 32, and a plurality of solenoid valves controlled according to a signal of the control unit 39 to open or close the plurality of orifices.

The solenoid valves turn on or off according to a moving distance of the body 44, measured by the sensor unit 71, according to a predetermined program, and accordingly the control unit 39 transmits an operating signal to the solenoid valves. The solenoid valves turn on or off individually, and the sum of all orifices opened by the solenoid valves becomes an entire open area.

In order to control the pressure more precisely, a plurality of orifices is used, and the orifices have different diameters from each other.

For example, in the present disclosure, the plurality of orifices may include a first orifice 21, a second orifice 22 and a third orifice 23 which have different diameters, and the plurality of solenoid valves may include a first solenoid valve 61, a second solenoid valve 62, and a third solenoid valve 63.

At this time, it is assumed that the first orifice 21 has an area of 1 $mm^2$, the second orifice 22 has an area of 0.5 $mm^2$, and the third orifice 23 has an area of 0.1 $mm^2$. In this case, by turning on or off the solenoid valves in various combinations, the entire open area of the orifices may have various combinations such as 0.1, 0.5, 0.6, 1.0, 1.1, 1.5, 1.6 or the like.

If it is assumed that all orifices have the same area of 0.5 $mm^2$, the entire open area of the orifices obtained by various on/off combinations of the solenoid valves may have just three combinations of 0.5, 1.0, 1.5, which is disadvantages in precise position control.

Figure 4:
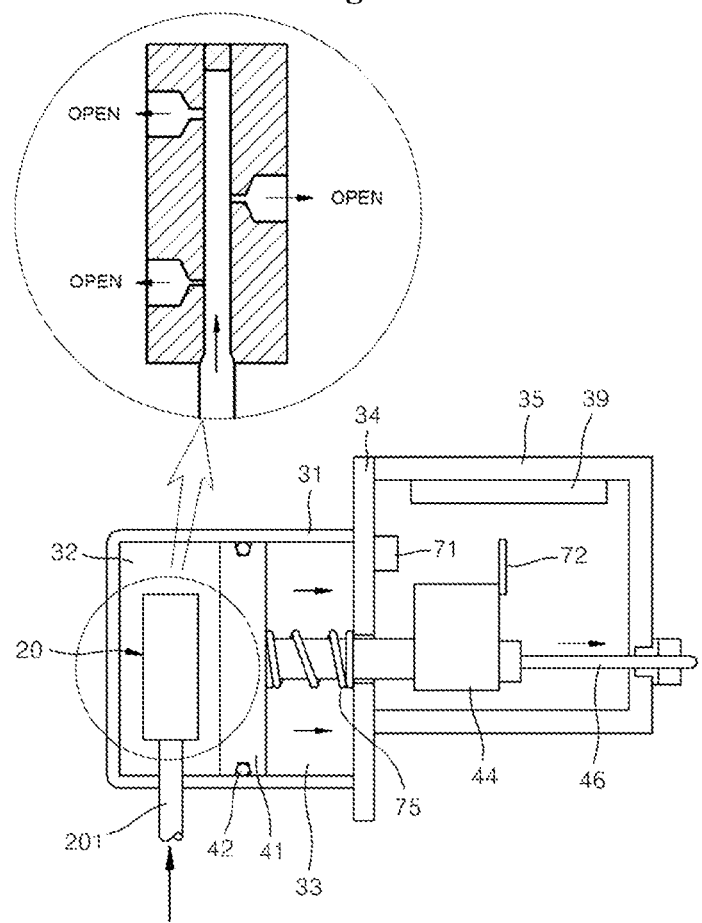
Figure 5:
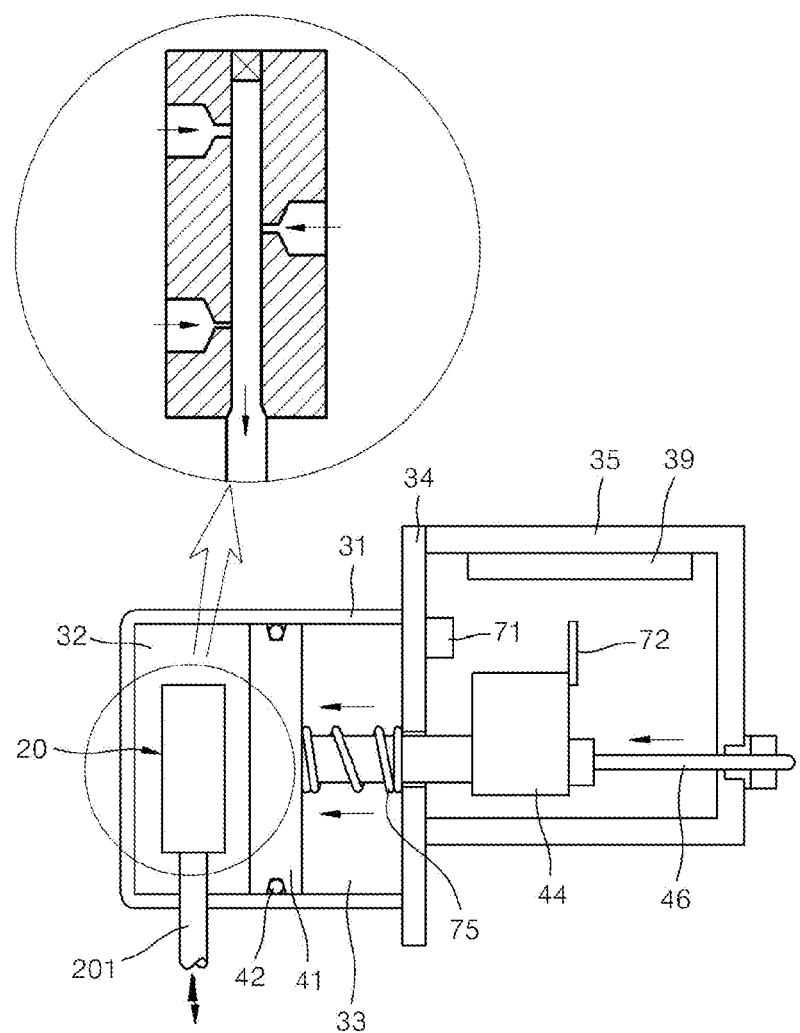
Figure 6:
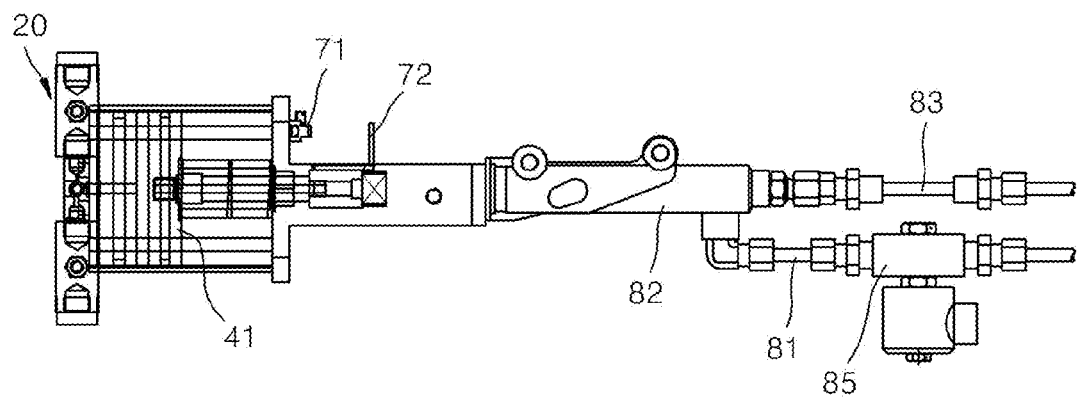
FIG. 6 is a diagram showing a clutch control device according to the present disclosure, which is in a mounted state.

FIGS. 4 and 5 are for illustrating the operating principle of the clutch control device according to the orifices which turn on or off by the manipulation of the solenoid valves.

FIG. 4 shows that a solenoid valve is operated to open each orifice, when the external pressure pump is in operation. In this case, a compressed air is introduced to the first chamber 32 through the orifice, and the pressure in the first chamber 32 increases.

In this case, the piston head 41 moves toward the second chamber 33 (to the front), and the hydraulic pressure regulating rod 46 located at the front of the body 44 supplies the hydraulic pressure of the cylinder 82 to the hydraulic line 83.

Generally, in the present disclosure, after the piston head 41 is moved to the front, a moving rate of the piston head 41 moving to the first chamber 32 according to the elastic member 75 is regulated.

This uses the principle as shown in FIG. 5, namely in a state where the external pressure pump turns off, the air in the first chamber 32 discharges to the outside through an open orifice. In the present disclosure, in this case, an entire open orifice area is regulated by opening or closing the orifices in various combinations by means of the solenoid valves.

By regulating the open area, a speed of the piston head 41 pulled to the rear may be adjusted, and eventually an operating rate or a releasing rate of the clutch may be adjusted.

In addition, the clutch control device of the present disclosure further includes a valve 85 configured to connect the cylinder 82 to a master cylinder 3 which supplies a hydraulic pressure by a manipulation of the clutch pedal 1, and a sensor configured to recognize whether the clutch pedal 1 is pressed. If it is sensed by the sensor that the clutch pedal 1 is pressed, the valve is opened, the control unit 39 stops the operation of the pressure pump, and the solenoid valves are opened.

In this case, the valve 85 may employ a 2-way valve. The 2-way valve is closed at ordinary time, but if a driver manually steps down a clutch, the 2-way valve is opened by a sensor which measures the clutch, and a fluid flows to the hydraulic line. If the valve is opened, the pressure pump comes to an off state instantly, and all solenoid valves are opened so that the body 44 moves rearwards.

However, this manual operation should be connected to brake and accelerator manipulations in addition to the clutch manipulation. In other words, sensors for detecting whether a brake and an accelerator are pressed may be provided in addition to the sensor for detecting a clutch, and the same function may be performed when pressing is detected.

In addition, as shown in FIG. 3, an auxiliary valve 24 may be further provided to the inner tube 25. In this circumstance, the auxiliary valve 24 may also be opened instantly so that the pressure in the first chamber 32 may be lowered within a shortest time.

Figure 7:
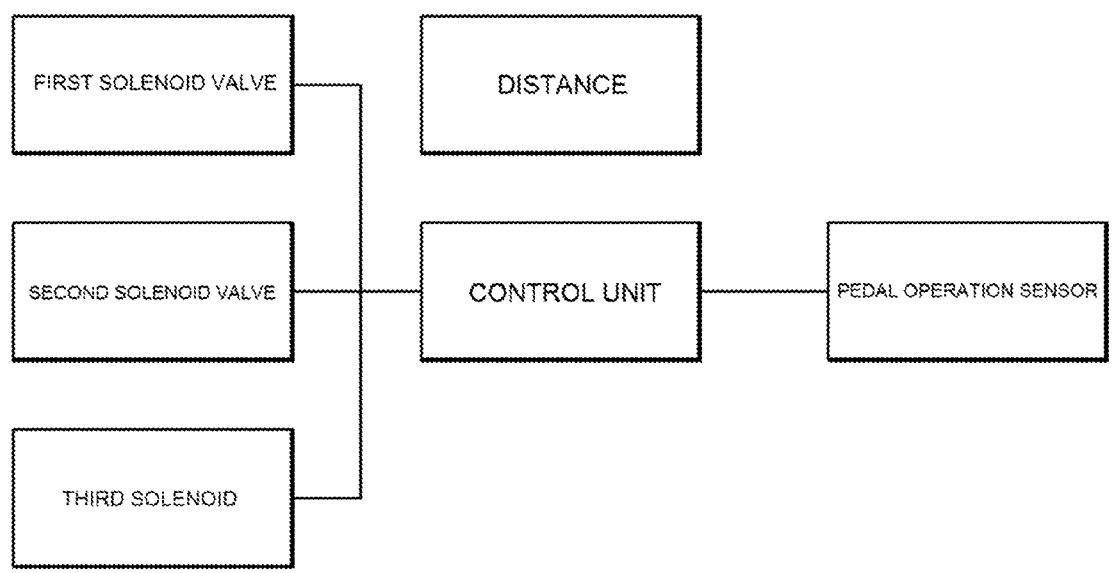
FIG. 7 is a block diagram showing a clutch control device according to the present disclosure.

FIG. 7 is a block diagram showing an operation of each solenoid value by the control unit according to the present disclosure. The control unit is connected to each sensor to operate each value.

The scope of the present disclosure is not limited to the above embodiments, and any changes or modifications containing the same technical spirit of the present disclosure may be regarded as falling within the scope of the present disclosure, which is defined by the appended claims.

The invention claimed is:

1. A clutch control device, which is connected to a booster cylinder for operating a clutch to control the clutch, the clutch control device comprising:
   a first housing;
   a body configured to be movable in a linear direction in the first housing and having a hydraulic pressure regulating rod;
   a cylinder connected to a hydraulic line connected to the booster cylinder, the hydraulic pressure regulating rod being partially inserted into the cylinder to supply a hydraulic pressure to the hydraulic line according to a movement of the body, wherein the hydraulic pressure regulating rod is provided at the body toward the cylinder;
   a sensor unit configured to measure a straight distance of the body which is moving in the first housing;
   a second housing provided adjacent to the first housing and opposite to the cylinder;
   a piston head configured to divide the second housing into a sealed first chamber and a sealed second chamber, the piston head being movable in a straight direction in the second housing due to a pressure difference between the first chamber and the second chamber;
   a piston rod configured to connect the piston head and the body;
   a pressure regulating unit provided in the first chamber to regulate a pressure; and
   a control unit for controlling a pressure of the pressure regulating unit according to a distance measured by the sensor unit.

2. The clutch control device of claim 1,
   wherein the pressure regulating unit is connected to a pressure pump located at the outside through an air flow tube, and
   wherein the pressure regulating unit includes:
      a plurality of orifices through which an air flows between the air flow tube and the first chamber, and
      a plurality of solenoid valves controlled according to a signal of the control unit to regulate the plurality of orifices to be opened or closed.

3. The clutch control device of claim 2,
   wherein the plurality of orifices are a first orifice, a second orifice and a third orifice, which have different diameters, and
   wherein the plurality of solenoid valves are a first solenoid valve, a second solenoid valve, and a third solenoid valve.

4. The clutch control device of claim 2, further comprising:
   a valve configured to connect the cylinder to a master cylinder which supplies a hydraulic pressure by a manipulation of a clutch pedal; and
   a sensor configured to recognize whether the clutch pedal is pressed,
   wherein when it is sensed by the sensor that the clutch pedal is pressed, the valve is opened, the control unit stops operation of the pressure pump, and the solenoid valves are opened.

5. The clutch control device of claim 1, further comprising a reflection plate which moves together with the body, wherein the sensor unit is fixed to the first housing to measure a straight distance from the reflection plate.

6. The clutch control device of claim 1, wherein an elastic member having a restoring force to push the piston head toward the first chamber is further provided in the second chamber.

7. A clutch control device, which is connected to a booster cylinder for operating a clutch to control the clutch, the clutch control device comprising:
   a first housing;
   a body configured to be movable in a linear direction in the first housing and having a hydraulic pressure regulating rod;
   a cylinder connected to a hydraulic line connected to the booster cylinder, wherein the hydraulic pressure regulating rod is provided at the body toward the cylinder;
   a sensor unit configured to measure a straight distance of the body which is moving in the first housing;
   a second housing provided adjacent to the first housing and opposite to the cylinder;
   a piston head configured to divide the second housing into a sealed first chamber and a sealed second chamber;
   a piston rod configured to connect the piston head and the body;
   a pressure regulating unit provided in the first chamber to regulate a pressure; and
   a control unit for controlling a pressure of the pressure regulating unit according to a distance measured by the sensor unit.

8. The clutch control device of claim 7, wherein the hydraulic pressure regulating rod being partially inserted into the cylinder to supply a hydraulic pressure to the hydraulic line according to a movement of the body.

9. The clutch control device of claim 7, wherein the piston head being movable in a straight direction in the second housing due to a pressure difference between the first chamber and the second chamber.

10. The clutch control device of claim 7, wherein the pressure regulating unit is connected to a pressure pump located at the outside through an air flow tube.

11. The clutch control device of claim 10, wherein the pressure regulating unit includes a plurality of orifices through which an air flows between the air flow tube and the first chamber, and a plurality of solenoid valves controlled according to a signal of the control unit to regulate the plurality of orifices to be opened or closed.

12. The clutch control device of claim 11,
wherein the plurality of orifices are a first orifice, a second orifice and a third orifice, which have different diameters, and
wherein the plurality of solenoid valves are a first solenoid valve, a second solenoid valve, and a third solenoid valve.

13. The clutch control device of claim 11, further comprising:
a valve configured to connect the cylinder to a master cylinder which supplies a hydraulic pressure by a manipulation of a clutch pedal; and
a sensor configured to recognize whether the clutch pedal is pressed,
wherein when it is sensed by the sensor that the clutch pedal is pressed, the valve is opened, the control unit stops operation of the pressure pump, and the solenoid valves are opened.

14. The clutch control device of claim 7, further comprising a reflection plate which moves together with the body, wherein the sensor unit is fixed to the first housing to measure a straight distance from the reflection plate.

15. The clutch control device of claim 7, wherein an elastic member having a restoring force to push the piston head toward the first chamber is further provided in the second chamber.

* * * * *